United States Patent [19]

Sammann

[11] 4,137,695
[45] Feb. 6, 1979

[54] CORN HARVESTERS

[76] Inventor: Ernest F. Sammann, Rte. 4, Box 73, Dimmitt, Tex. 79027

[21] Appl. No.: 796,882

[22] Filed: May 16, 1977

[51] Int. Cl.² ............................................ A01D 45/02
[52] U.S. Cl. ........................................ 56/119; 56/106
[58] Field of Search ............................ 56/119, 94–98, 56/105, 106, 14.1, 14.2, 107–116, 317

[56] References Cited

U.S. PATENT DOCUMENTS

| 1,219,327 | 3/1917 | Keeler | 56/106 |
| 3,271,940 | 9/1966 | Ashton et al. | 56/105 |
| 3,331,196 | 7/1967 | Grant | 56/106 |
| 3,584,444 | 6/1971 | Sammann | 56/119 |

Primary Examiner—Russell R. Kinsey
Attorney, Agent, or Firm—Marcus L. Bates

[57] ABSTRACT

A corn saver apparatus removably attached to a self-propelled commercially available corn harvester which facilitates harvesting of corn growing in a field. The apparatus comprises an agricultural implement which augments a standard corn harvester by picking up stalks of corn which have fallen, and further by moving broken stalks of corn into the harvesting apparatus. The apparatus of the present invention is removably mounted in overlying relationship respective to the gathering apparatus of a conventional corn harvester and significantly increases the yield realized from a field of corn by avoiding the waste of corn which heretofore has been left lying on the ground.

14 Claims, 9 Drawing Figures

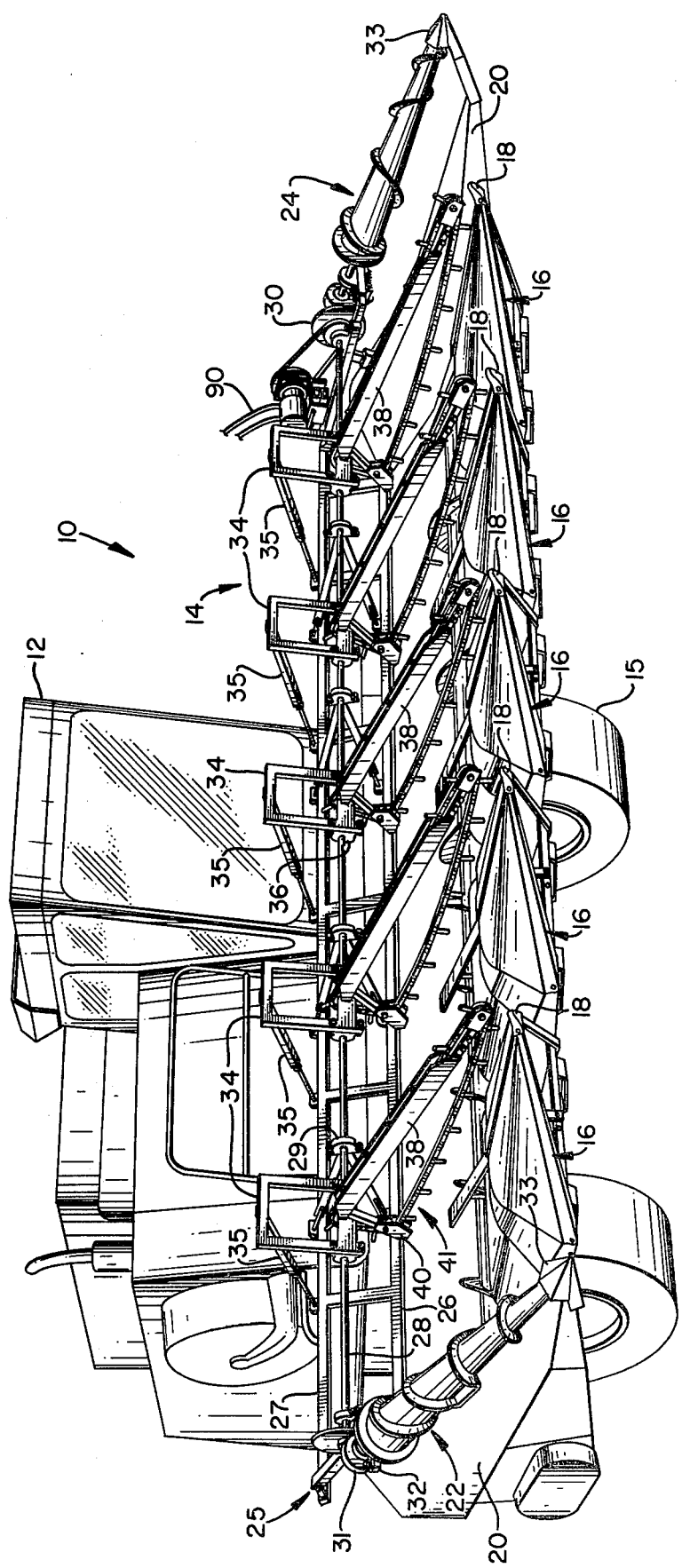
FIG. I

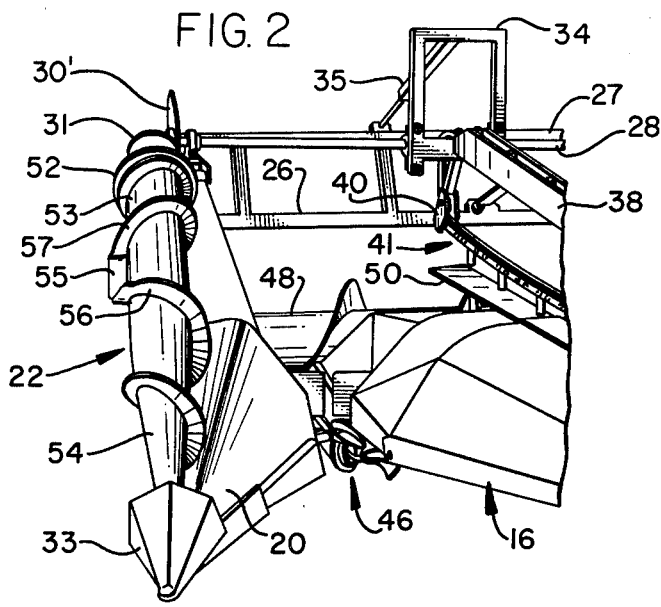
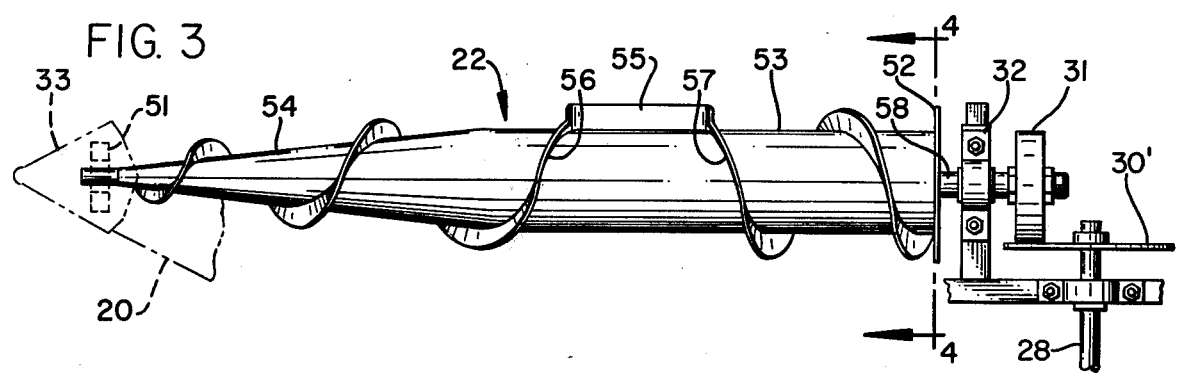
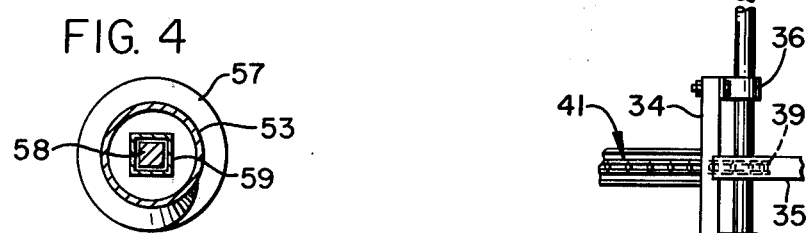
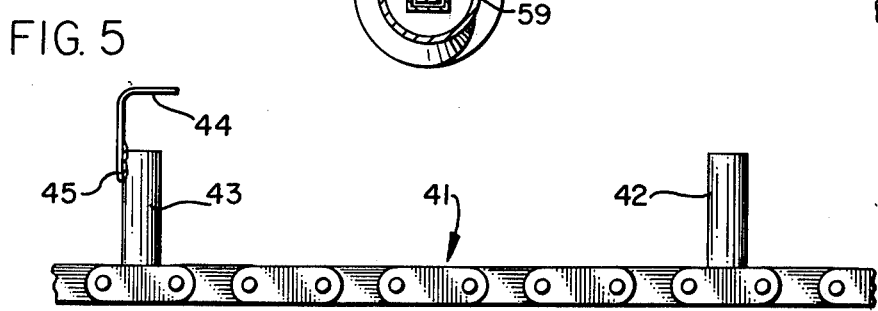

CORN HARVESTERS

THE PRIOR ART

My previously issued U.S. Pat. No. 3,584,444 and the art cited therein.

BACKGROUND OF THE INVENTION

There are many commercially available corn harvesting apparatuses available on the market, as for example, a self-propelled John Deere Model 7700 Combine with a Model 645 corn header. Generally these prior art corn harvesters are capable of harvesting corn from four or more rows. The corn harvesting apparatus usually is removably attached to the forward end of a self-propelled vehicle so that the vehicle can be utilized for other purposes, as for example, harvesting and threshing wheat and baling alfalfa.

The corn harvesting apparatus of the prior art includes a plurality of forwardly directed snouts having snapping rolls located therebetween so that the snouts can travel between the rows of corn stalks, thereby causing the stalks of corn to be drawn between the snapping rolls, whereupon the ears of corn are pulled from the stalks and subsequently transferred into a lateral conveyor.

The conveyor transports the ears of corn into the interior of the harvesting apparatus whereupon the ears are shucked, the kernels of corn removed from the corn cob, the shelled corn transferred into a storage hopper, and the shucks and corn cobs are ground, shredded, and redeposited on the field as a mulch.

During the growing and harvesting season there are many critical periods of time when the farm is potentially profitable at one moment and potentially bankrupt at another merely because of the whims of nature and fate. Probably the most critical moment for the corn farmer is that time immediately preceding the harvest operation when one can observe vast quantities of corn standing beautiful and upright in the field, but alas this person may awaken the next day to discover the stalks of corn lying haphazardly about in disarray because wind and rain has descended upon the heretofore beautiful field of corn consequently tangling and tearing the stalks into complete disarray. This situation causes a tremendous loss in yield because many of the stalks are left lying on the ground, while other stalks have been left broken and can no longer be properly manipulated by the snapping rows, so that the ears of corn cannot be removed therefrom. Further, other stalks will subsequently become broken loose from the root system during the snapping operation. The above loss in yield because of ears of corn left lying in the field can sometime equal or exceed all of the farmer's profit for his entire years work.

Therefore it is advantageous to be able to combine still another mechanical apparatus with the corn harvesting apparatus wherein the two mechanisms complement each other in such a manner that the broken and fallen stalks are picked up and guided into the snapping rolls or directly into the lateral conveyor so that substantially all of the corn grown in the field is passed through the harvester and saved. This new combination of elements is especially desirable at this particular time in history when farm help is exceedingly difficult to obtain because of the many poverty programs and the farmer must therefore resort to mechanized expedients if he is to continue to feed both the parasites as well as the workers of our nation.

Heretofore, long before the present invention was divulged to those skilled in the art, the operator of a harvesting machine occasionally would be forced to stop his machine in the field, climb out upon the corn harvesting apparatus, and rake broken stalks of corn, weeds and other interfering materials into the lateral conveyor before the machine could efficiently proceed with the harvesting operation. From time to time an operator has slipped and fallen into the lateral conveyor where he is conveyed into the interior of the harvester, or caught by the snapping rolls. Such a bizarre accident usually results in fatalities. The present apparatus eliminates the necessity of the operator ever being forced into this dangerous situation.

SUMMARY OF THE INVENTION

A corn saver apparatus adapted to be combined with a corn harvester apparatus. The corn saver apparatus causes broken and fallen stalks of corn to be conveyed into the harvesting apparatus rather than left lying on the field. The apparatus of the present invention is removably affixed to a conventional corn harvesting apparatus by the arrangement of a laterally positioned drive shaft mounted in superimposed relationship above the lateral conveyor of a corn harvester, thereby providing a drive means as well as a support means for a series of endless conveyors made in accordance with the present invention.

The endless conveyors are supported by a cantilever arm with the arm being superimposed over a plurality of centrally located corn gathering snouts. The arms include a free end forwardly disposed in proximity of the snouts with there being a series of outwardly disposed lugs carried by the endless conveyor. Broken and fallen stalks are engaged and transported rearwardly towards the lateral conveyor by the endless conveyor thereby enabling the snapping rolls to remove the ears of corn from the stalks, or alternatively, transporting the ear laden stalks to a beater device which facilitates the handling of broken stalks of corn by the harvester.

A pair of augers are arranged in opposition and cooperate with the action of the snouts, lateral conveyor, beater, and endless conveyor. The augers are arranged in a particular manner so that a stalk of corn is engaged and moved toward the marginal central area of the auger, whereupon a knocker device impacts the ear of corn, knocking the ear inwardly toward the centrally located snouts, whereupon the ear is subsequently conveyed to the lateral conveyor and into the threshing apparatus.

The auger, beater, and endless conveyor are all supported by a common framework and driven by a common shaft. The beater device is supported by the common drive shaft and includes a driven shaft.

Accordingly, a primary object of the present invention is the provision of improvements in corn harvesting apparatus which enables damaged corn laden stalks to be transported into a corn harvesting apparatus.

Another object of this invention is the provision of improvements wherein stalks of corn which have fallen to the ground are picked up and the ears of corn removed therefrom.

Still another object of this invention is the provision of a new combination wherein stalks of corn are efficiently transported from overlying relationship respective to a series of snouts.

A still further object of this invention is to provide an improved apparatus which is attachable to a conventional corn harvester and which prevents the upper surface of the snouts thereof from becoming overburdened with corn stalks and weeds.

Still another object of the present invention is the provision of improvements associated with corn harvesting apparatus that picks up fallen corn stalks and moves the stalk upwardly along the incline of the snout in order that the stalks of corn can be forced to pass between the snapping rolls and thereafter into the thresher so that the kernels of corn can be removed from the corn cob.

A further object of this invention is the provision of an auger like apparatus for lifting fallen stalks in such a manner that the ears of corn are engaged and impacted so that the ears are forced laterally of the harvester into proximity of the centrally arranged snouts. The above objects are attained in accordance with the present invention by the provision of a combination of elements which are fabricated in a manner substantially as described in the above abstract and summary.

These and various other objects and advantages of the invention will become readily apparent to those skilled in the art upon reading the following detailed description and claims and by referring to the accompanying drawings.

BRIEF DESCRIPTION OF THE DRAWINGS

FIG. 1 is a front perspective view of a corn harvesting apparatus which includes the corn saver apparatus made in accordance with the present invention;

FIG. 2 is an enlarged, fragmentary, perspective view which discloses additional details of the apparatus seen in FIG. 1;

FIG. 3 is an enlarged top plan view of part of the apparatus disclosed in FIGS. 1 and 2, with some parts being broken away therefrom, and other parts being shown in phantom so as to more clearly disclose the details of the present invention;

FIG. 4 is a cross-sectional view taken along line 4—4 of FIG. 3;

FIG. 5 is an enlarged, fragmentary, side elevational view of part of the apparatus seen in the foregoing figures;

DETAILED DESCRIPTION OF THE PREFERRED EMBODIMENT

Figure 6:
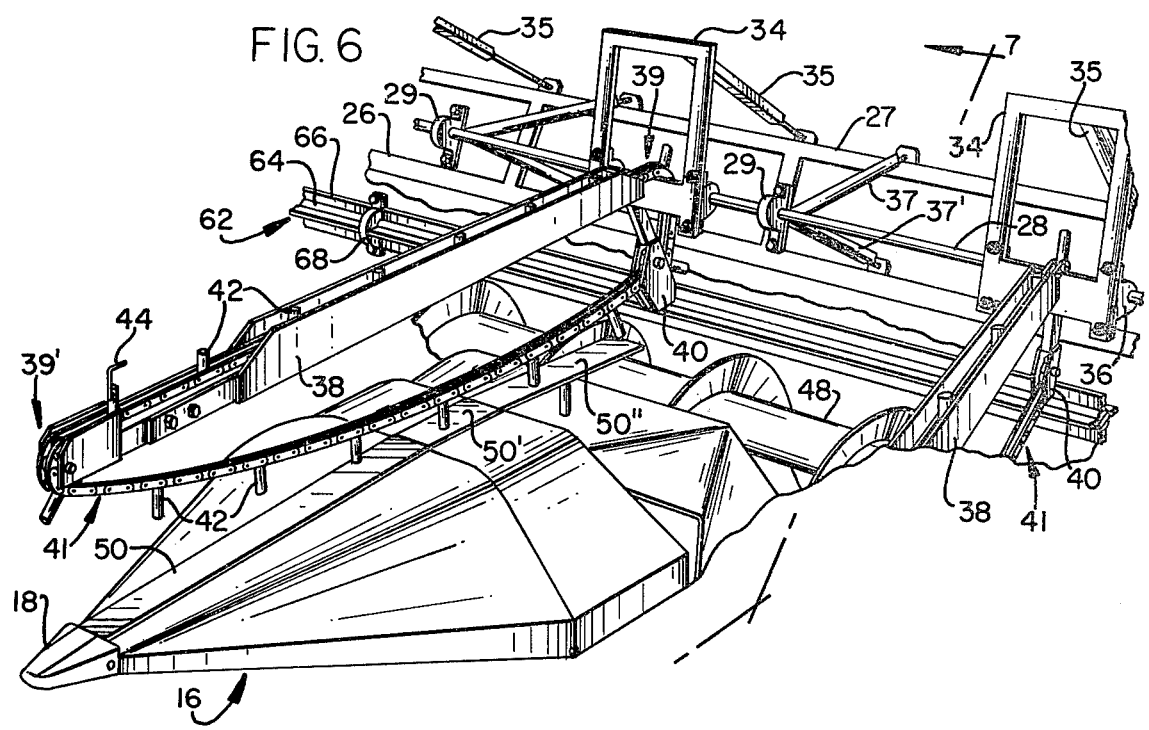
FIG. 6 is an enlarged, fragmentary, perspective view having some parts removed therefrom so as to better disclose the essence of the present invention.

Throughout the various figures of the drawings wherever possible or logical to do so, like or similar numerals will refer to like or similar elements.

In FIG. 1 there is disclosed a corn harvesting apparatus 10 which includes a John Deere Model 7700 combine to which there is affixed a John Deere Model 645 corn harvester. The apparatus 10 includes the present invention in combination therewith as will be better appreciated later on as this specification is more fully digested. The combine 12 includes a driver's cab, thresher, and untold numbers of other parts and mechanisms known to those skilled in the art. Forwardly mounted respective to the combine is the corn saver apparatus 14 made in accordance with the present invention. The corn saver apparatus is mounted in superimposed relationship respective to the corn harvester which includes a plurality of snouts 16 of conventional design. The snouts terminate in a shoe or nose 18.

The starboard side of the combination includes an outermost snout 20 to which there is operatively associated an auger 22 rotatably mounted and aligned longitudinally respective to the directon of travel of the combine. The port side of the apparatus includes a similar auger 24 with the latter rotating anticlockwise and the former rotating clockwise as viewed from the forward end of the entire assemblage.

The corn saver apparatus of the present invention comprises a main support frame, generally illustrated by the arrow at numeral 25, fabricated from longitudinally extended, laterally disposed, parallel members 26 and 27 which are cross braced and affixed to one another in such a manner that the frame 25 can support the entire corn saver apparatus. A main drive shaft 28 is driven by the illustrated hydraulic motor and is supportingly disposed coextensive with the main frame work.

Figure 7:
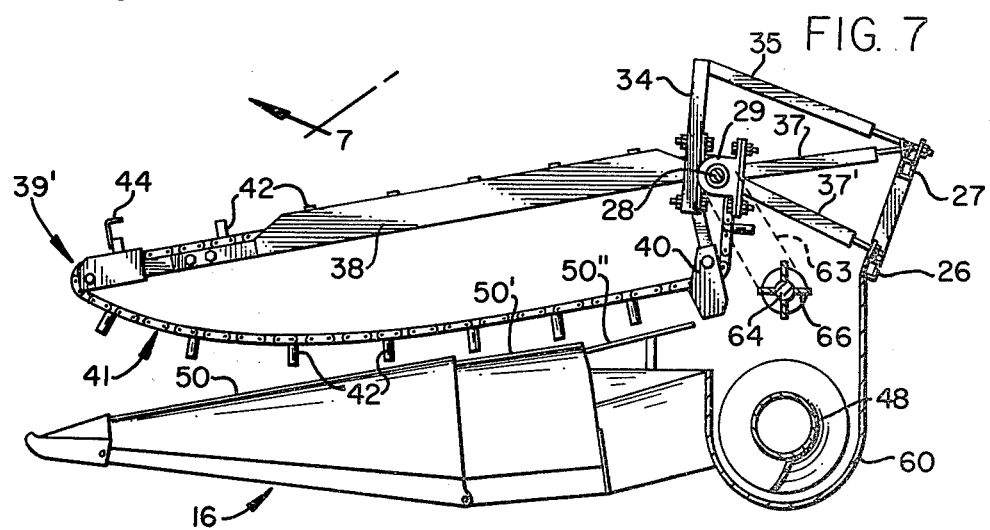
FIG. 7 is a cross-sectional view taken along line 7—7 of FIG. 6, with a minimum of parts being shown for clarity.

As best seen in FIGS. 6 and 7, the shaft is supported in spaced relationship respective to the frame by means of a plurality of spaced apart journals 29. Opposed terminal ends of the shaft terminate in attached relationship respective to a plate member 30 which drives a wheel 31 placed normal thereto so that plate 30 is a drive wheel while plate 31 is a driven wheel. As best seen in FIGS. 1 and 3, journal 32 is affixed to the main frame and supports the upper enlarged end of the auger device 22.

A cover 33 forms the forward terminal end of the auger device 22 and the snout 20 with there being a journal means underlying the cover by which the forward reduced diameter end of the auger device 22 is supported by the snout, as will be discussed in greater detail later on in this disclosure.

As seen in various figures of the drawings, a yoke assembly 34 extends upwardly in spaced relationship respective to the frame 25 and includes a rearwardly directed strut number 35. The strut enables the yoke to be adjustably affixed in spaced relation respective to member 27. The yoke includes the illustrated spaced legs, each of which are journaled to the main shaft 28 as seen at 36 in FIGS. 1 and 3.

Accordingly, the main shaft 28 is supported in journaled relationship respective to the main frame 25, while the plurality of spaced yokes 34 are supported by the shaft 28 with part of the load thereof being carried by the adjusting strut 35. The journals 29 include a plurality of spaced apart load carrying trunions 37, 37' by which the main drive shaft is suitably supported in the aforesaid spaced relationship respective to the main frame 25.

Rigidly affixed to the lower end portion of the yoke is a cantilever arm 38 and an idler arm 40. One end of the cantilever arm is attached equidistant along the shaft at a location between the spaced legs of the yoke, with the cantilever arm depending or extending away from the yoke to present a free end which can be pivoted into close proximity of the shoe 18. Accordingly, adjustable change in the length of the strut 35 pivots the yoke 34 about the main shaft 28 while at the same time the cantilever arm 38 is pivoted about said shaft.

As seen in FIGS. 3 and 6 together with other figures of the drawings, a sprocket 39 is affixed to the main shaft 28 at a location between the legs of the yoke, and is rotated thereby. Idler arm 40 is affixed to and extends in opposition respective to the yoke and the cantilever arm. The idler arm includes a sprocket therewithin. The free end of the cantilever arm includes sprocket 39'. Endless chain 41 is driven by sprocket 39 and is maintained in the illustrated configuration of FIGS. 6 and 7 by the idler sprockets at 39' and 40.

Lugs 42 are welded to the master links of the chain and interposed in spaced relationship respective to one another within the endless chain. One lug 43 of each endless chain includes a weed remover apparatus 44 welded in the illustrated manner seen at 45.

As seen in FIG. 2, a conventional corn snapper device 46 is located near the lower extremity and between each of the snouts. Lateral conveyor 48 has the spirals thereof arranged in opposite pitch on each marginal end thereof so that ears of corn are conveyed towards the center of the machine where they are transferred into the thresher thereof in the conventional manner.

Wear strip 50 is replacably affixed to the upper surface of the snout in the illustrated manner of FIGS. 6 and 7. The lugs 42 engage the wear strip rather than the upper thin metal surface of the snout, thereby preventing damage thereto.

As seen in FIGS. 2 and 3, journal 51 underlies the cover 33 and rotatably supports the forward end of the auger in a pivotal manner. The opposed enlarged terminal end of the auger is provided with a plate member 52 concentrically arranged with respect to the elongated marginal central constant diameter portion 53. The auger device tapers at 54 into a conical configuration. The medial part of the auger includes a flat plate member 55 which is affixed to the outer peripheral wall surface of the constant diameter portion 53 and arranged parallel to the axial centerline of the auger. Each end of the plate continues in opposed directions in a manner to provide spirals 56 and 57 of opposite pitch so that, as the shaft 58 imparts axial rotation to the auger, a stalk of corn located at either marginal end of the auger device will be forced toward the plate member 55.

Plate member 55 of auger 22 rotates clockwise so that when the plate contacts an ear of corn, the ear of corn will be knocked toward the centrally located snouts where it ultimately will be forced into the thresher.

As seen in FIGS. 3 and 4, the shaft 58 is telescopingly received within an elongated tubular member 59 to thereby provide a telescoping driven shaft so that as the nose member pivots respective to the main frame 25, telescoping motion between the driven shaft 58 and driven member 59 takes place to thereby account for the motion between the main frame and the end of the snout.

As seen in FIGS. 6 and 7, a trough like monocoque structure 60 forms the major support for the frame, snouts, and lateral conveyor 48. Overlying the lateral conveyor 48 is a novel beater device 62. The beater device is driven by chain 63 by means of the main shaft 28. A secondary shaft 64 supports a plurality of radially spaced vanes 66 which are arranged in the form of elongated fins. The fins extend from end to end of the beater device except for interruptions caused by the intermediate spaced apart marginal portions which enable the spaced bearings 68 to maintain the beater device in rotatable spaced relationship respective to the main frame, the trough, and the lateral conveyor.

Figure 8:
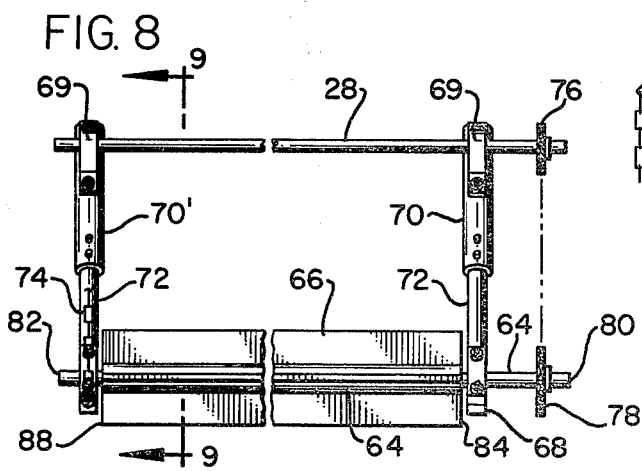
FIG. 8 is an isolated view which discloses the operative relationship of part of the application previously disclosed in FIGS. 6 and 7; and, FIG. 9 is a cross-sectional view taken along line 9—9 of FIG. 8.
Figure 9:
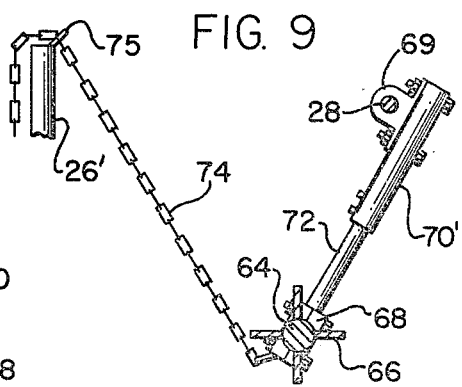

As seen in FIGS. 7-9, the beater device 62 is supported in journaled relation at several spaced locations by the provision of journal means 68 and 69, and arm 70, in such a manner that the main shaft 28 essentially supports the secondary shaft 64. The arm 70 includes a telescoping reduced diameter portion 72 sideably received therewithin. The bearing 68 is connected to chain 74 so that hook 75 can receive the remaining marginal end of the chain, thereby permitting proper positioning of the beater device 62 respective to the remaining coacting apparatus.

Drive sprocket 76 is affixed to shaft 28 and drives sprocket 78 by means of the aforesaid drive chain 63. The opposed ends 80, 82 of shaft 64 are preferably arranged to dispose the driven shaft parallel to the axial centerline of the lateral conveyor 48 so that the beater can extend in superimposed parallel relationship essentially along the entire length of the trough 60. The ends of the beater at 84 and 88 are arranged so that essentially any stalk of corn entering the trough will be broken up into convenient lengths so that they can be received along with the ears of corn and suitably processed by the thresher.

In this disclosure, and especially in the claims, the terms "chains 63, sprocket 76," are intended to include other devices, as for example, a fan belt and pulley or a shaft having bevel gears on the extremities thereof, for example. Furthermore, it is contemplated that the endless conveyor chain 41 could intead be belting, or other similar apparatus which achieves the same purpose as the illustrated embodiment of the invention and accordingly these variations are deemed to lie within the comprehension of the claim subject matter.

OPERATION

In operation the apparatus disclosed in FIG. 1 moves along a field of corn with the snouts 16 being arranged such that the stalks of corn are guided between the snouts and towards the snap rolls 46. Consequently, the action of the snap rolls remove the ears of corn from the stalks and transfers the ears into the lateral conveyor 48. The lateral conveyor moves material towards the central marginal portion thereof so that all of the corn is delivered through a single opening into the thresher. The details of the thresher, the lateral conveyor 48, the snouts 16 and 20, and the snap rolls 46 are known and appreciated by those skilled in the art, reference having already been made to one commercially available example thereof.

Many stalks of corn are partially broken near the ground by the action of insects and other vermin. These stalks are usually broken from the root system during or before harvesting and consequently the snap rolls cannot engage the ears thereof with sufficient force to pull the ear from the stalk. Consequently, in the absence of the present invention, this stalk often causes a log jam wherein a large pile of stalks and weeds commences to overburden the upper surface of the plurality of the snouts. The present invention avoids this undesirable situation by transferring the broken stalks directly to the beater 62 and auger 48 wherein the stalks are either separated from the ears for subsequent processing or the stalks are reduced in size so that the flow thereof through the remainder of the processing equipment occurs more efficiently.

Many stalks lying at an angle respective to the vertical will be engaged by the auger whereupon the oppositely pitched spiral will move the stalk towards plate 55. This action enables the plate 55 to strike the ear of corn, knocking the ear laterally toward the centrally located snouts.

The weed remover 44 prevents large tumble weeds and the like from accumulating top side of the equipment by continually forcing the overburden of weeds back toward the forward end of the snout, where ultimately the weeds reach the ground and pass away from the combine.

The cooperative action between the known harvesting apparatus and the improved continuous conveyor 41, beater 62, and auger 22 provide unexpected advantageous heretofore unattainable in the prior art apparatus.

The corn saver apparatus of the present invention can be readily removed from a corn harvester by disconnecting the hydraulic pump at 90, unbolting bearings 51, and unbolting the main frame from the harvester structure whereupon the entire corn saver apparatus can be lifted free of the corn harvester implement.

I claim:

1. In a harvester apparatus arranged to be propelled along the ground and having a plurality of forwardly directed snouts arranged in side-by-side relation which are adapted to pass between crop rows to guide corn laden stalks therebetween and into a corn gathering snapping row and a lateral conveyor, the combination with said harvester apparatus of a pickup apparatus by which fallen stalks are guided into said harvester;

said pickup apparatus comprising a support frame, a laterally arranged drive shaft mounted on said support frame in superimposed relationship above said lateral conveyor, drive means for axially rotating said shaft, a cantilever arm superimposed over the central location of said snouts and having a free end disposed in close proximity of the forward end of said snout and a pivoted end supported in journaled relation on said shaft;

said pivoted end includes a yoke journaled to said shaft and supportedly affixed to said journaled end of said cantilever arm such that said yoke can be pivoted about said shaft to pivotally move said free end of said cantilever arm about said shaft;

a drive sprocket affixed to said shaft, an idler sprocket affixed to said free end of said arm, an endless conveyor disposed about each of said sprockets, said conveyor including lugs attached thereto by which a corn stalk is moved toward said lateral conveyor; and, means affixing the free end of said yoke to said harvester apparatus;

an auger associated with the outermost of saids snouts, said auger having a spiral screw formed thereon; said auger having a forward end journaled to the free end of said snout and a driven end journaled to said support frame;

drive means by which said shaft axially rotates said auger, said auger on one side of said harvester rotating in an opposed direction respective to the auger located on the other side;

said auger having a cylindrical configuration which includes a constant diameter body adjacent said drive shaft and a conical body adjacent the free end of said snout; a spiral located about said constant diameter portion; a spiral located about said conical portion; the last two spirals being arrange in opposed directions; a plate member connecting said spirals together and affixed to said constant diameter portion whereby stalks are forced towards said plate member and the ears of corn thereon are knocked laterally toward the centrally located ones of the snouts.

2. The combination of claim 1 wherein said drive means includes a plate member at each extremity of said main shaft, a wheel attached to and axially aligned with said auger, said wheel and said plate being arranged normal to one another so that said plate member drivenly engages the outer periphery of said wheel.

3. The combination of claim 2 wherein said auger includes a spline connection at said drive shaft to thereby compensate for pivotal movement of said snout.

4. The combination of claim 1 wherein said lugs extend outwardly away from said conveyor such that a series of downwardly directed lugs are superimposed above the uppermost surface of a snout to thereby enable the lugs to engage stalks of corn and move the stalks of corn towards said lateral conveyor.

5. The combination of claim 1 wherein said lateral conveyor is located in a trough, and further including a beater apparatus mounted for rotation within said trough and in superimposed spaced relationship respective to said lateral conveyor and underlying said main frame;

said beater having a shaft spaced from and parallel to and supported from said main shaft; drive means interconnecting the beater shaft with said main shaft so that the beater is axially rotated; and, said beater includes a series of radially disposed elongated ribs which engage and beat the stalks of corn.

6. The combination of claim 4 wherein at least one said lug is provided with a weed remover;

said weed remover being affixed to and extending away from said lug and away from said endless chain; said weed remover being in the form of a hook member turned opposite to the direction of travel of said endless chain to thereby provide a large bearing surface between said wear plate and said weed remover.

7. The beater of claim 5 and further including a journaled means affixed to said main shaft, a journaled means affixed to said beater shaft, a support arm interconnecting the last two said journal means thereby supporting said beater from said main shaft; and, means for positioning said beater respective to said main frame, said endless conveyor, and said lateral conveyor.

8. In a combine having a corn harvester apparatus operatively mounted thereto and arranged to be propelled along the ground, with a plurality of forwardly directed snouts thereof arranged in side-by-side aligned relationship which are adapted to pass between crop rows to thereby guide corn laden stalks therebetween and into a corn gathering snapping row and then to a lateral conveyor which transports the corn to a thrasher, the combination with said harvester apparatus of a corn saver apparatus by which fallen stalks are picked up and guided into said harvester;

said corn saver apparatus includes a support frame removably mounted to said harvester apparatus, a laterally arranged drive shaft, journal means by which said shaft is mounted on said support frame in spaced relation on said lateral conveyor, means for axially rotating said drive shaft, a cantilever arm superimposed over the central location of said ones of the snouts, said arm has a free end disposed in close proximity of the forward end of said snout with the other end of said arm being supported in journaled relation respective to said shaft;

said other end of said arm includes a yoke, means by which said yoke is journaled on said drive shaft and supportedly affixed to said journaled end of said cantilever arm such that said yoke can be pivoted about said drive shaft to pivotally move said free end of said cantilever arm about said drive shaft;

a drive sprocket affixed to said drive shaft, an idler sprocket mounted on said free end of said arm, an endless conveyor disposed about each of said sprockets, said endless conveyor including lugs attached thereto and outwardly depending therefrom by which a corn stalk is moved from overlying relation respective to a snout toward said lateral conveyor; the free end of said yoke being affixed to said support frame such that the relative position of the arm respective to the snout can be adjusted;

an auger associated with the outermost of said snouts, means rotating said augers in opposed directions, the augers being mirror images of one another;

each auger having a constant diameter marginal end and a conical marginal end with the free terminal end of the conical portion being journaled on the forward end of an outermost snout; the terminal end of the constant diameter marginal end being journaled on said support frame; a constant diameter spiral formed on said constant diameter marginal end, a conical spiral formed on said conical marginal end, a plate member positioned between the two recited spirals, th two recited spirals being of opposite pitch so that a corn stalk engaged by the auger is moved into engagement with the plate member which knocks an ear of corn it may contact laterally towards the central snouts.

9. The combination of claim 8 wherein said means rotating said auger includes a circular plate member at each extremity of said main shaft, a wheel attached to and axially aligned with said auger, said wheel and said plate being arranged normal to one another so that said plate member drivenly engages the outer periphery of said wheel.

10. The combination of claim 9 wherein said auger includes a spline connection at said drive shaft to thereby compensate for pivotal movement of said snout.

11. The combination of claim 8 wherein said lugs outwardly extend away from said conveyor such that a series of downwardly directed lugs are superimposed above the uppermost surface of said snout to thereby enable the lugs to engage stalks of corn and move the stalks of corn towards said lateral conveyor.

12. The combination of claim 8 wherein said lateral conveyor is located in a trough, and further including a beater apparatus mounted for rotation within said trough and in superimposed spaced relationship respective to said lateral conveyor and underlying said main frame;

said beater having a shaft spaced from and parallel to and supported from said main shaft; drive means interconnecting the beater shaft with said main shaft so that the beater is axially rotated; and, said beater includes a series of radially disposed elongated ribs which engage and beat the stalks of corn.

13. The combination of claim 12 wherein there is a journaled means affixed to said main shaft, a journaled means affixed to said beater shaft, a support arm interconnecting the last two said journal means thereby supporting said beater from said main shaft; and, means for positioning said beater respective to said main frame, said endless conveyor, and said lateral conveyor.

14. The combination of claim 8 wherein at least one said lug is provided with a weed remover;

said weed remover being affixed to and extending away from said lug and away from said endless chain; said weed remover being in the form of a hook member turned opposite to the direction of travel of said endless chain to thereby provide a large bearing surface between said wear plate and said weed remover.

* * * * *

UNITED STATES PATENT OFFICE
CERTIFICATE OF CORRECTION

Patent No. 4,137,695          Dated February 6, 1979

Inventor(s) ERNEST F. SAMMANN

It is certified that error appears in the above-identified patent and that said Letters Patent are hereby corrected as shown below:

Column 7, line 53, correct the spelling of "said";

Column 8, line 65, substitute --to-- for "on";

Column 8, line 68, delete "ones of the";

Column 9, line 33, correct the spelling of "the" second occurrence;

Column 9, line 37, insert --ones of the-- after "central".

Signed and Sealed this

Twenty-first Day of August 1979

[SEAL]

Attest:

LUTRELLE F. PARKER

Attesting Officer     Acting Commissioner of Patents and Trademarks